United States Patent
Sinivaara

(10) Patent No.: US 7,672,263 B2
(45) Date of Patent: Mar. 2, 2010

(54) ADAPTIVE POWER SAVE MODE FOR SHORT-RANGE WIRELESS TERMINALS

(75) Inventor: Hasse Sinivaara, Espoo (FI)

(73) Assignee: Nokia Corporation, Espoo (FI)

( * ) Notice: Subject to any disclaimer, the term of this patent is extended or adjusted under 35 U.S.C. 154(b) by 811 days.

(21) Appl. No.: 10/555,107

(22) PCT Filed: Jun. 30, 2003

(86) PCT No.: PCT/FI03/00527

§ 371 (c)(1),
(2), (4) Date: Nov. 2, 2005

(87) PCT Pub. No.: WO2005/002137

PCT Pub. Date: Jan. 6, 2005

(65) Prior Publication Data

US 2007/0036096 A1 Feb. 15, 2007

(51) Int. Cl.
*H04B 7/185* (2006.01)
(52) U.S. Cl. .................. 370/318; 370/328; 370/311; 455/522
(58) Field of Classification Search .................. 370/310, 370/311–312, 318, 338, 328; 455/574, 517, 455/500, 41.2, 452.1–453, 522, 69
See application file for complete search history.

(56) References Cited

U.S. PATENT DOCUMENTS

| | | | |
|---|---|---|---|
| 6,067,297 A * | 5/2000 | Beach | 370/389 |
| 6,674,738 B1 * | 1/2004 | Yildiz et al. | 370/338 |
| 7,126,945 B2 * | 10/2006 | Beach | 370/389 |
| RE40,032 E * | 1/2008 | van Bokhorst et al. | 455/343.2 |
| 7,457,973 B2 * | 11/2008 | Liu | 713/310 |
| 2002/0016151 A1 | 2/2002 | Romans | |
| 2003/0114204 A1 | 6/2003 | Allen et al. | |
| 2003/0210658 A1 * | 11/2003 | Hernandez et al. | 370/311 |
| 2004/0041538 A1 * | 3/2004 | Sklovsky | 320/127 |
| 2004/0120292 A1 * | 6/2004 | Trainin | 370/338 |
| 2004/0190467 A1 * | 9/2004 | Liu et al. | 370/311 |
| 2004/0264413 A1 * | 12/2004 | Kaidar et al. | 370/332 |

FOREIGN PATENT DOCUMENTS

| | | |
|---|---|---|
| WO | WO 00/62429 | 10/2000 |
| WO | WO 02/25826 | 3/2002 |

* cited by examiner

*Primary Examiner*—Kamran Afshar
(74) *Attorney, Agent, or Firm*—Squire, Sanders & Dempsey, LLP

(57) ABSTRACT

The invention relates to a method for controlling power consumption in a short-range wireless terminal. In order that the power save mode could be adapted to the traffic pattern of the terminal, the data traffic of the terminal is monitored and at least one parameter describing the data traffic is defined. Based on said at least one parameter and the beacon interval information received in beacon frames, the power state of the terminal is dynamically controlled so that the terminal is maintained in one of at least two power states including an active state and a power save state.

13 Claims, 2 Drawing Sheets

ADAPTIVE POWER SAVE MODE FOR SHORT-RANGE WIRELESS TERMINALS

FIELD OF THE INVENTION

The invention relates generally to wireless terminals intended for short-range, beacon-based communication systems. More particularly, the present invention concerns a mechanism for decreasing power consumption in such terminals by controlling the power state of the terminals.

BACKGROUND OF THE INVENTION

The current development towards truly mobile computing and networking has brought on the evolvement of various access technologies that also provide the users with access to the Internet when they are outside their own home network. At present, wireless Internet access is typically based on either short-range wireless systems or mobile networks, or both.

Short-range wireless systems have a typical range of one hundred meters or less. They often combine with systems wired to the Internet to provide communication over long distances. The category of short-range wireless systems includes wireless personal area networks (PANs) and wireless local area networks (LANs). They have the common feature of operating in unlicensed portions of the radio spectrum, usually either in the 2.4 GHz Industrial, Scientific, and Medical (ISM) band or in the 5 GHz Unlicensed-National Information Infrastructure (U-NII) band.

Wireless personal area networks use low cost, low power wireless devices that have a typical range of about ten meters. The best-known example of wireless personal area network technology is Bluetooth, which uses the 2.4 GHz ISM band. It provides a peak air link speed of one Mbps and power consumption low enough for use in personal, portable electronics such as PDAs and mobile phones. Wireless local area networks generally operate at higher peak speeds of 10 to 100 Mbps and have a longer range, which requires greater power consumption.

Wireless LAN systems are typically extensions of a wired network, providing mobile users with wireless access to the wired network. Examples of wireless local area network technology include the IEEE 802.11a, which is designed for either the 2.4 GHz ISM band or the 5 GHz U-NII band, and uses orthogonal frequency division multiplexing (OFDM) to deliver up to 54 Mbps data rates; the 802.11b, which is designed for the 2.4 GHz ISM band and uses direct sequence spread spectrum (DSSS) to deliver up to 11 Mbps data rates; and the HIPERLAN Standard, which is designed to operate in the 5 GHz U-NII band.

In wireless LAN technology, two basic network topologies are available for network configuration: an ad-hoc network and an infrastructure network. An ad-hoc network is formed by two or more independent mobile terminals without the services of a base station, i.e. in an ad-hoc network the terminals communicate on a peer-to-peer basis. An ad-hoc network is normally formed for temporary purposes. The infrastructure network, in turn, comprises one or more wireless base stations, called access points, which form part of the wired infrastructure. In this type of network, all traffic goes through the access points, regardless of whether the traffic is between two terminals or a terminal and the wired network, i.e. the mobile terminals do not communicate on a peer-to-peer basis. The mobile terminals are provided with wireless LAN cards, whereby they can access the wired network or set up an ad-hoc network.

So far, WLAN technology has been used mainly in laptop computers, which are typically AC powered, but which may also be used in battery mode that provides a fairly high battery capacity. To prolong the life of the batteries, the WLAN standards define a specific power save mode into which the terminals may enter in order to decrease their power consumption. In this mode the WLAN-specific power consumption is very low, but the terminals have to wake up (i.e. enter the active state) periodically to receive regular beacon transmissions broadcast in the network. In the infrastructure networks, each access point sends beacon frames at regular intervals. The beacon transmissions indicate whether there are incoming packets buffered for a terminal. If so, the terminal retrieves the packets, goes back to sleep (i.e. to the power save state), and wakes up again to listen to the next beacon transmission. In an ad-hoc network, where no access points exist, one of the wireless terminals assumes the responsibility of sending the beacon frame. Having received a beacon frame, each terminal of the ad-hoc network waits for the beacon interval and then broadcasts a beacon frame if any other terminal does not do so after a random time delay calculated by the terminal. The purpose of the random time delay is to circulate the beacon broadcast responsibility among the terminals of the ad-hoc network.

One drawback with the WLAN power management in terminals is that it is designed assuming that the terminal devices are laptop type computers featuring a relatively high battery capacity. Along with the generalization of various other types of personal communication devices, such as intelligent phones, having a smaller size and thus also a lower battery capacity than laptop computers, power consumption has, however, become a critical issue when new properties are designed for wireless systems and terminals.

Thus there is a need to accomplish a solution by means of which the power consumption of the terminals can be decreased in a WLAN type environment where beacon messages must be taken into account when controlling the power state of a terminal.

SUMMARY OF THE INVENTION

An objective of the invention is to devise a new mechanism for decreasing the power consumption of wireless terminals intended for a short-range, beacon-based communication system, where the terminals constantly enter a power save mode in which data transmission and reception is not possible, contrary to an active mode. A beacon-based system here refers to a system featuring beacon messages or similar broadcasts that must be taken into account when controlling the power state of the terminal.

In the present invention, a wireless, short-range communication terminal is provided with a traffic analyzing entity that controls the power save mode according to an analysis of the traffic of the terminal. In this way, the sleep intervals of the terminal can be adapted according to the traffic pattern of the terminal.

Thus one aspect of the invention is the provision of a method for controlling power consumption in a wireless short-range communication terminal having at least two different power states. The method includes the steps of:
  receiving beacon frames at beacon intervals;
  extracting beacon interval information from a beacon frame;
  monitoring the data traffic of the terminal;
  defining at least one parameter describing the data traffic; and based on said at least one parameter and the beacon interval information, dynamically controlling the power state of the terminal so that the terminal is maintained in one of the at least two power states, wherein a first power state is an active state and a second power state is a power save state.

In a further aspect the invention provides a wireless short-range communication terminal. The terminal includes:

means for receiving beacon frames at beacon intervals;

means for extracting beacon interval information from a beacon frame;

traffic monitoring means for monitoring data traffic of the terminal and for defining at least one parameter describing the data traffic; and power management means for dynamically controlling the power state of the terminal based on said at least one parameter and said beacon interval information, thereby to maintain the terminal in one of at least two power states, wherein a first power state is an active state and a second power state is a power save state.

The control mechanism of the invention allows the sleep intervals of the terminal to be adapted to the current traffic pattern of the terminal, whereby the power save mode can more efficiently utilize the silent periods, during which no transmission or reception occurs.

Other features and advantages of the invention will become apparent through reference to the following detailed description and accompanying drawings.

BRIEF DESCRIPTION OF THE DRAWINGS

In the following, the invention and its preferred embodiments are described more closely with reference to the examples shown in FIGS. 1 to 6 in the appended drawings, wherein.

DETAILED DESCRIPTION OF THE INVENTION

The terminal of the invention is a short-range wireless communication terminal, preferably based on the IEEE 802.11 standards for wireless local area networking. Furthermore, the terminals of the invention are preferably such that they can operate both in the infrastructure mode and in the ad-hoc mode, although it is also possible that they are only ad-hoc capable devices, as discussed below.

Figure 1:
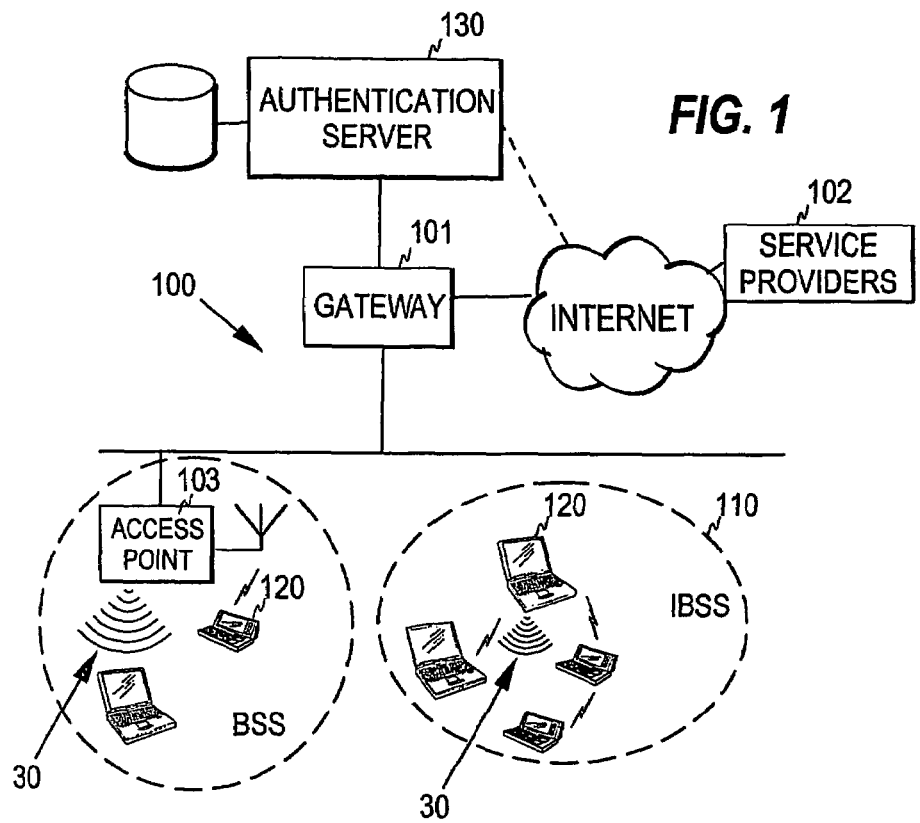
FIG. 1 illustrates an example of a communication environment in which the principles of the present the invention may be beneficially implemented.

FIG. 1 illustrates an example of an environment in which the principles of the present invention may be beneficially implemented, namely a typical WLAN communication system. The system includes one or more WLAN networks 100, each connected by means of a gateway 101 (a router) to another network, such as the Internet, which contains service providers 102. Each WLAN network comprises one or more access points 103, each communicating wirelessly with the terminals within the coverage area, i.e. the cell, of the access point and thus forming a bridge between the terminals and the wired network.

In an infrastructure network an access point and at least one terminal is said to form a Basic Serving Set (BSS). A series of BSSs then forms an Extended Service Set (ESS). These BSSs are connected to each other by a Distribution System (DS), which can be a wired network, such as an Ethernet LAN, within which TCP/IP packets are transmitted, or a wireless network, or a combination of these two. However, the basic type of an IEEE 802.11 LAN is an Independent BSS (IBSS), which consists of two or more terminals. The terminals of an IBSS form an ad-hoc network 110. As the present invention does not relate to the architecture of the WLAN system, it is not discussed in more detail here.

The terminals may be portable computers, PDA equipment, intelligent phones or other such mobile terminals 120. In the same way as an ordinary GSM telephone, the terminals can be made up of two parts: the actual subscriber device, e.g. a portable computer (with software), and a SIM (Subscriber Identity Module), whereby from the viewpoint of the network the subscriber device becomes a functioning terminal only when the SIM has been inserted into it. The SIM may be a subscriber identity module for use in the GSM (Global System of Mobile communications) network or in the UMTS (Universal Mobile Telecommunication System), for example. In the latter case it is termed a USIM (Universal Services Identity Module). However, the terminals may equally well be traditional WLAN terminals in which no SIM is used.

The system further typically contains an authentication server 130 of the WLAN network. The authentication server is connected to the above-mentioned gateway through a secured connection, which is typically a TCP/IP connection established through an operator network or through the Internet. As discussed below, in an infrastructure network the access points broadcast beacon messages 30, while in an ad-hoc network the terminals share this responsibility.

Figure 2:
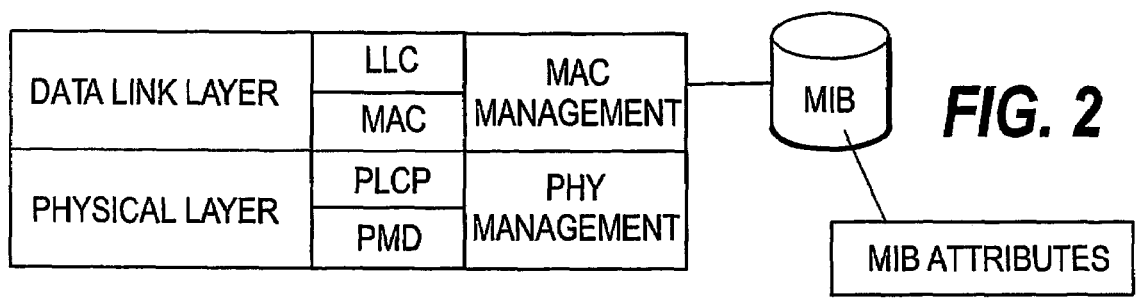
FIG. 2 illustrates the MAC entity utilized in the present invention.

The IEEE standard 802.11 defines the physical layer options and the MAC (Media Access Control) layer protocol for the wireless LAN. FIG. 2 illustrates the protocol architecture of the IEEE 802.11 standard. As shown in the figure, the actual MAC protocol operates in the lower sub-layer of the second layer of the OSI layer model, which is the Data Link Layer (DLL). The MAC management layer supports the association and roaming functionalities and it further controls the power saving functions, the authentication and encryption mechanisms, and synchronization of the terminals, for example. The MAC management layer further maintains a MAC layer management database, i.e. the MIB (Management Information Base) of the MAC layer. The MAC layer cooperates with the physical management layer to maintain the database.

The physical layer is divided into two sub-layers, which are the PLCP (Physical Layer Convergence Protocol) sub-layer and the PMD (Physical Medium Dependent) sub-layer. The purpose of the PLCP is to provide minimum dependence on the PMD in order to simplify the interface between the physical layer and the MAC layer.

Figure 3:
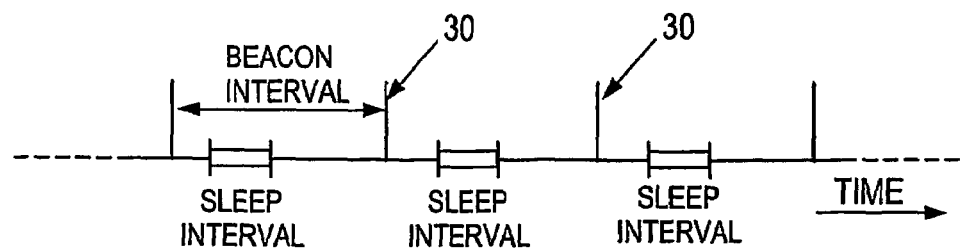
FIG. 3 illustrates a typical wake/sleep cycle of the terminal.

As is known, in WLAN networks beacon frames are broadcast periodically to enable the terminals to establish and maintain communications in an orderly fashion. FIG. 3 illustrates the sending of beacon frames 30 at regular intervals. Each frame carries various information, which may include, for example, the identifier of the WLAN in question, a timestamp, and the value of the beacon interval. The beacon interval, i.e. the amount of time between two successive beacon transmissions, determines when the terminal may enter the power save mode and when it has to wake up to listen to the beacon transmission. Between the beacons, the terminals may thus enter the power save mode, provided that they have nothing to transmit or receive. During this sleep interval, the WLAN-specific power consumption of the terminal is very low. The terminal informs the access point when it is about to enter the power save state, so that the access point knows to begin to buffer the traffic destined for the terminal. The present sleep interval implementations are static with fixed sleep interval characteristics being configured in the manufacturing phase of the terminal. These fixed characteristics set the limits for the sleep/wake rhythm of the terminal.

Figure 4:
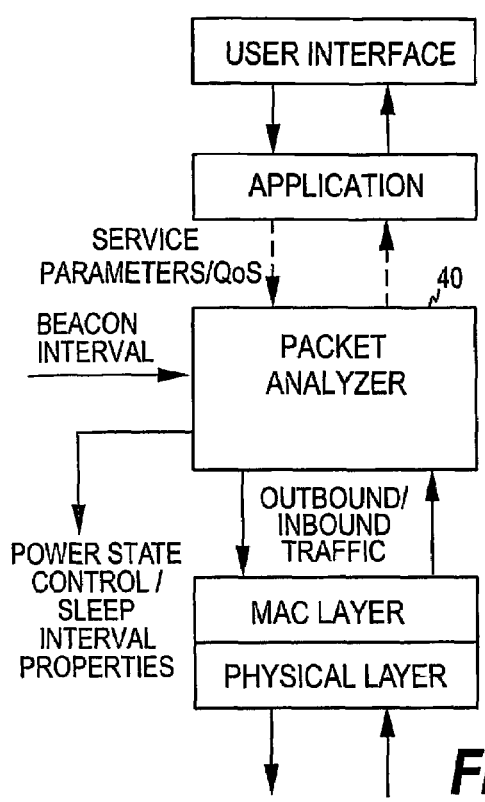
FIG. 4 illustrates the basic terminal architecture according to one embodiment of the present invention.

In the present invention, the power save mode is made adaptive by adapting the sleep intervals to the traffic pattern of the terminal. As illustrated in FIG. 4, which illustrates the basic terminal architecture according to one embodiment of the present invention, this is implemented by inserting a traffic analyzer 40 between the MAC and the application layers of the terminal. The traffic analyzer is an entity that performs an analysis on the traffic pattern of the terminal, and defines, based on the analysis and the beacon interval, the current sleep interval characteristics for the terminal. As the analysis is performed continuously, the sleeping interval adapts dynamically to the traffic pattern of the terminal.

Figure 5:
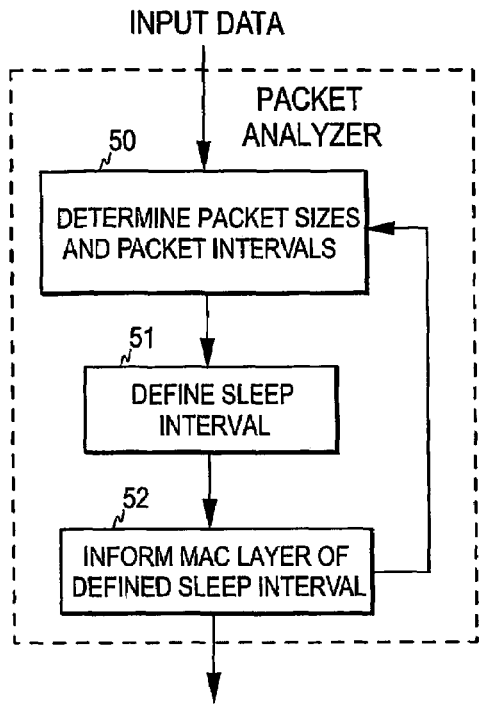
FIG. 5 is a flow diagram illustrating one embodiment of the traffic analyzing entity of the invention.

FIG. 5 is a flow diagram illustrating one embodiment of the operation of the traffic analyzer. The traffic analyzer receives input data that includes the incoming and outgoing traffic of the terminal, or at least parameters describing this traffic. The input data further includes the beacon interval information, which is received in the beacon frames. Based on the input data, the packet analyzer determines (measures) packet sizes and packet intervals (step 50) and defines a first set of parameters describing the traffic pattern of the terminal. This set thus typically includes parameters describing packet sizes and packet intervals, such as maximum, minimum and average packet sizes and intervals, and/or distributions of the packet sizes and intervals. Based on the parameters, the packet analyzer determines a second set of parameters, which describe the sleep intervals (step 51). The second set typically includes parameters that indicate the timing, length and frequency of the sleep interval. The packet analyzer then informs the power management functionality of the MAC layer of the sleep interval defined (step 52). The traffic pattern is analyzed continuously in order to change the sleep interval parameter (s) immediately when there is a significant change in the traffic pattern. The parameters of the defined sleep interval may be written into the MAC MIB, for example.

In the above-described embodiment the traffic analyzer is a separate entity that provides control information for the MAC layer, which then controls the power states of the terminal according to the control information. However, the packet analyzer may also be integrated with the MAC layer so that the analyzer directly controls the power states. In this case, the sleep interval parameters are not necessarily defined similarly as when defining the said parameters for the actual controlling entity within the MAC layer.

Depending on the content of the input data, there are two basic embodiments of the invention. In the first embodiment the input data includes, in addition to the beacon interval, the incoming and outgoing traffic, or parameters describing the said traffic. In the second embodiment, the traffic analyzing entity is further provided with an interface to the application layer (shown as dashed arrows in FIG. 4). Through this interface, the traffic analyzer obtains additional input data from the application(s) residing in the terminal and/or from the user. The additional input data is supplied by an application that is active at each time and the said data describes the requirements that the traffic analyzer must take into account when determining the characteristics of the sleep interval. This additional data may include limiting values that represent the boundaries of a service that the application finds acceptable. Another alternative is that the application informs the traffic analyzing entity of the Quality of Service (QoS) level required. The level is then mapped to corresponding parameters in the traffic analyzer. The application may also set a number of QoS requirements from which the user and/or the terminal may select the desired requirements based on the conditions. This means that the sleep interval is given certain initial characteristics, which meet the QoS requirements of the application. Later, when the application is running, the traffic analyzing entity analyzes the traffic, such as the medium access intervals, and adjusts the initial characteristics based on the analysis and on the limiting values given by the application and/or the user.

The traffic analyzing entity may control the terminal into the power save mode several times during a beacon interval, or it may define a sleep interval that lasts more than one beacon interval. The beacon frames may be transmitted regularly, or an adaptive beacon interval may be used. An adaptive beacon interval adapts to the load experienced by the beacon transmitting entity (access point or an ad-hoc node). A beacon transmission method like this is disclosed in a co-pending U.S. patent application Ser. No. 10/400,233, filed on Mar. 25, 2003. In this method, the beacon interval is decreased if the load decreases enough, and increased if the load increases enough. The load can be measured as the channel utilization level, for example. The beacon interval is decreased and increased preferably by adding beacon transmission moments between fixed beacon transmission moments and removing beacon transmission moments from between fixed transmission moments, respectively. The transmission moments are added and removed so that all the transmission moments are evenly distributed in the time domain.

Figure 6:
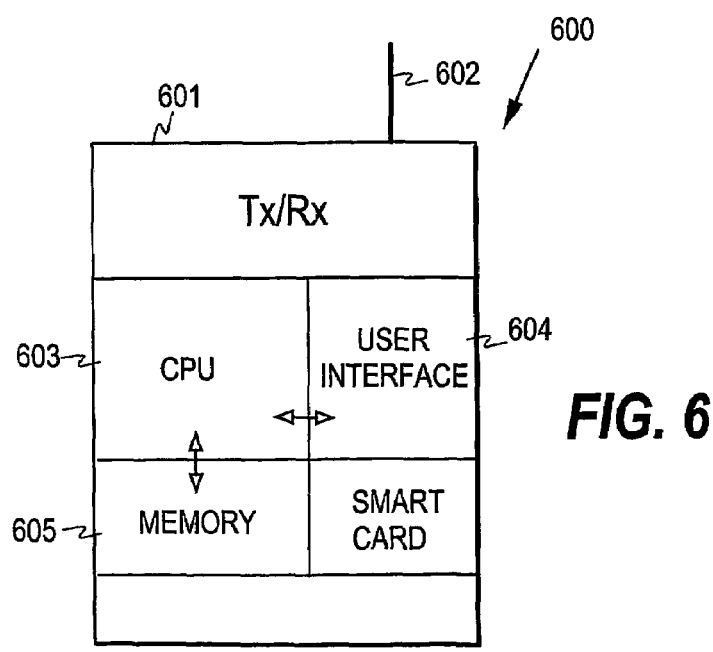
FIG. 6 is a block diagram illustrating the basic elements of the terminal according to one embodiment of the invention.

FIG. 6 illustrates the basic elements of the terminal according to one embodiment of the invention. The mobile terminal 600 comprises a transceiver 601 provided with at least one antenna 602, a control unit 603, user interface means 604 for creating a user interface through which the user can operate the terminal, and memory means 605, which may include one or more smart cards 506, such as a SIM card. However, as discussed above, a SIM card is not included in a traditional WLAN terminal. The control unit performs the basic functions described above, i.e. the monitoring of the traffic and the control of the power states, the control information needed being stored in the memory means. With the user interface means the user may input additional input data for the control process.

The method of the invention may be used in connection with a standard WLAN terminal. However, the method may also be used in connection with a terminal intended for ad-hoc networks only. Examples of ad-hoc only devices could be various game terminals, payment terminals communicating with vending machines, or electronic notepads, which may exchange files with other terminals. The terminal may also be used in different short-range wireless networks featuring beacon messages or similar broadcasts that must be taken into account when controlling the power state of the terminal.

Although the invention was described above with reference to the examples shown in the appended drawings, it is obvious that the invention is not limited to these, but may be modified by those skilled in the art without departing from the scope and spirit of the invention. For example, it is possible that another entity in the terminal analyzes the traffic and supplies traffic parameters to the traffic analyzer, which then defines the sleep interval characteristics and/or controls the power states. Furthermore, the traffic analyzer does not necessarily have to be between the MAC and the application layers of the terminal, but it may also reside elsewhere in the terminal.

The invention claimed is:

1. A method, comprising:
   receiving beacon frames at beacon intervals;
   extracting beacon interval information from a beacon frame;
   monitoring the data traffic of a terminal;
   defining at least one parameter describing a data traffic pattern of the terminal; and
   dynamically controlling a power state of the terminal by the terminal, on the basis of said at least one parameter describing the data traffic pattern of the terminal and the beacon interval information, so that the terminal is maintained in one of at least two power states; and
   supplying additional input data comprising at least one requirement parameter describing requirements set by an application, active in the terminal, for the controlling the power state of the terminal,
   wherein said at least two power states comprise an active state and a power save state, and
   wherein the monitoring comprises monitoring packet sizes and packet intervals of the data traffic.

2. A method according to claim 1, wherein said at least one parameter describes packet sizes and packet intervals.

3. A method according to claim 1, wherein the controlling comprises determining a sleep interval defining time periods when the power save state is possible.

4. A method according to claim 3, wherein the determining comprises determining parameters indicating a timing, a length, and a frequency of the sleep interval.

5. A method according to claim 1, wherein said at least one requirement parameter indicates the maximum period that the terminal may continuously be in the power save state.

6. A method according to claim 1, wherein said at least one requirement parameter indicates the quality of service level required by the application.

7. A method according to claim 6, further comprising:
   mapping the quality of service level to input parameters for the controlling the power state of the terminal.

8. An apparatus, comprising:
   a receiver configured to receive beacon frames at beacon intervals;
   an extractor configured to extract beacon interval information from a beacon frame;
   traffic monitor configured to monitor data traffic of a terminal and to define at least one parameter describing a data traffic pattern of the terminal; and
   a controller configured to manage power for dynamically controlling a power state of the terminal on the basis of said at least one parameter describing the data traffic pattern of the terminal and said beacon interval information to maintain the terminal in one of at least two power states,
   wherein said at least two power states comprises an active state and a power save state,
   wherein the traffic monitor comprises a packet analyzer configured to analyze packet sizes and packet intervals,
   wherein the controller comprises an interface configured to control applications residing in the terminal and to receive additional input data from an application, and
   wherein the additional input data comprises at least one requirement parameter describing requirements set by the application for the controller.

9. An apparatus according to claim 8, wherein the terminal is a wireless local area network terminal.

10. A system, comprising:
    at least one system entity configured to broadcast beacon frames at beacon intervals; and
    at least one wireless terminal configured to extract beacon interval information from a beacon frame,
    wherein said at least one wireless terminal comprises
       a traffic monitor configured to monitor data traffic of said at least one wireless terminal and to define at least one parameter describing a data traffic pattern of the terminal, and
       a controller configured to dynamically control a power state of said at least one wireless terminal on the basis of said at least one parameter describing the data traffic pattern of the terminal and said beacon interval information to maintain said at least one wireless terminal in one of at least two power states,
    wherein said at least two power states comprise an active state and a power save state,
    wherein the traffic monitor comprises a packet analyzer configured to analyze packet sizes and packet intervals,
    wherein the controller comprises an interface configured to control applications residing in the terminal and to receive additional input data from an application, and
    wherein the additional input data comprises at least one requirement parameter describing requirements set by the application for the controller.

11. A system according to claim 10, wherein said at least system entity is a wireless terminal.

12. A system according to claim 10, wherein said at least system entity is an access point connected to a wired network.

13. An apparatus, comprising:
    receiving means for receiving beacon frames at beacon intervals;
    extracting means for extracting beacon interval information from a beacon frame;
    traffic monitoring means for monitoring data traffic of a terminal and to define at least one parameter describing a data traffic pattern of the terminal; and
    controlling means for managing power for dynamically controlling a power state of the terminal by the terminal on the basis of said at least one parameter desribing the data traffic pattern of the terminal and said beacon interval information to maintain the terminal in one of at least two power states,
    wherein said at least two power states comprise an active state and a power save state,
    wherein the traffic monitoring means is further for analyzing packet sizes and packet intervals,
    wherein the controlling means is further for controlling applications residing in the terminal and receiving additional input data from an application, and
    wherein the additional input data comprises at least one requirement parameter describing requirements set by the application for the controlling means.

* * * * *